US012429211B1

(12) United States Patent
Zhang

(10) Patent No.: US 12,429,211 B1
(45) Date of Patent: Sep. 30, 2025

(54) CABINET AND CABINET DOOR HAVING DETACHABLE MAGNIFYING MIRROR AND ILLUMINATION

(71) Applicant: J SING LLC, Lewes, DE (US)

(72) Inventor: Guangsheng Zhang, Guangzhou (CN)

(73) Assignee: J SING LLC, Lewes, DE (US)

( * ) Notice: Subject to any disclaimer, the term of this patent is extended or adjusted under 35 U.S.C. 154(b) by 0 days.

(21) Appl. No.: 18/885,298

(22) Filed: Sep. 13, 2024

(30) Foreign Application Priority Data

Aug. 28, 2024 (CN) ......................... 202422096541.0

(51) Int. Cl.

| | |
|---|---|
| ***F21V 33/00*** | (2006.01) |
| *F21V 23/04* | (2006.01) |
| *F21Y 103/10* | (2016.01) |
| *F21Y 113/00* | (2016.01) |
| *F21Y 115/10* | (2016.01) |

(52) U.S. Cl.
CPC ........ *F21V 33/004* (2013.01); *F21V 23/0485* (2013.01); *F21Y 2103/10* (2016.08); *F21Y 2113/00* (2013.01); *F21Y 2115/10* (2016.08)

(58) Field of Classification Search
CPC .... F21V 33/004; F21V 23/0485; F21V 33/00; F21V 7/00; F21Y 2103/10; F21Y 2115/10; F21Y 2113/00
See application file for complete search history.

(56) References Cited

U.S. PATENT DOCUMENTS

| | | | | |
|---|---|---|---|---|
| 3,315,932 A * | 4/1967 | Chandler | ................. | A47G 1/00 248/295.11 |
| 5,164,861 A * | 11/1992 | Katz | ...................... | G02B 7/182 359/872 |
| 11,147,405 B2 * | 10/2021 | Stanley, Jr. | ............ | A47G 29/08 |
| 2014/0265768 A1 * | 9/2014 | Diemel, Jr. | ............ | A47B 67/02 312/224 |
| 2016/0047539 A1 * | 2/2016 | Cano | .................. | F21V 33/0012 362/133 |
| 2020/0029689 A1 * | 1/2020 | Yao | ..................... | F21V 23/0485 |

* cited by examiner

*Primary Examiner* — Bao Q Truong

(57) ABSTRACT

A wall-mounted cabinet includes a cabinet body and a cabinet door coupled to the cabinet body. The cabinet door includes a door frame, a first layer disposed on a first side of the door frame, a second layer disposed on a second side of the door frame opposite of the first side, a light assembly coupled to the second layer and configured to illuminate through the second layer, and a magnifying mirror removably coupled to an area of the second layer that is surrounded by the light assembly.

20 Claims, 10 Drawing Sheets

CABINET AND CABINET DOOR HAVING DETACHABLE MAGNIFYING MIRROR AND ILLUMINATION

FIELD

Examples of the present disclosure generally relate to cabinets, and in particular to an illuminated cabinet with a detachable magnifying mirror.

BACKGROUND

Wall-mounted cabinets, such as medicine cabinets, are bathroom fixtures designed to store medications, toiletries, and personal care items. In recent years, wall-mounted cabinet designs have advanced to incorporate more aesthetic and functional features, such as glass-fronted doors and integrated lighting, creating a more streamlined and user-friendly experience. Magnifying mirrors have also become an essential item in the bathroom as they are often used for shaving and applying makeup. Modern magnifying mirrors have built-in lighting around the mirror to improve visibility. However, these modern magnifying mirrors require their own power source and can take up extra space in an already crowded bathroom.

Thus, solutions for integrating a wall-mounted cabinet with a magnifying mirror are desired.

SUMMARY

The present disclosure relates to an illuminated cabinet with a detachable magnifying mirror, substantially as shown in and/or described in connection with at least one of the figures, as set forth more completely in the claims.

According to one aspect of the present disclosure, a cabinet includes a cabinet body, a cabinet door coupled to the cabinet body, where the cabinet door comprises a door frame, a first layer disposed on a first side of the door frame, a second layer disposed on a second side of the door frame opposite of the first side, the second layer having a reflective surface, a light assembly coupled to the second layer and configured to illuminate through the second layer, and a mirror removably coupled to an area of the second layer surrounded by the light assembly.

According to another aspect of the present disclosure, a cabinet door includes a door frame, a first layer disposed on a first side of the door frame, a second layer disposed on a second side of the door frame opposite of the first side, the second layer having a reflective surface, a light assembly coupled to the second layer and configured to illuminate through the second layer, and a mirror removably coupled to an area of the second layer surrounded by the light assembly.

BRIEF DESCRIPTION OF THE DRAWINGS

The appended drawings illustrate a number of example implementations and are a part of the present disclosure. Together with the following description, these drawings demonstrate and explain various principles of the present disclosure. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
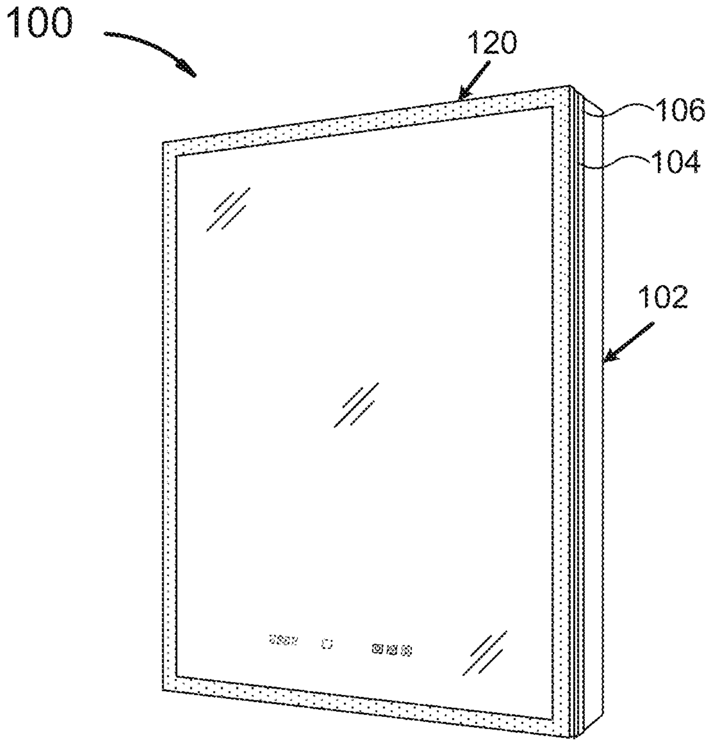
FIG. 1A illustrates a perspective view of a cabinet, in accordance with an example implementation of the present disclosure.

Various features are described hereinafter with reference to the figures. It should be noted that the figures may or may not be drawn to scale and that the elements of similar structures or functions are represented by like reference numerals throughout the drawings. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described. Rather, the present disclosure covers all modifications, equivalents, and alternatives falling within the scope of the appended claims.

Implementations of the present disclosure describe a wall-mounted cabinet having integrated (or built-in) light assemblies and a detachable magnifying mirror.

According to an aspect of the present disclosure, a cabinet includes integrated (or built-in) light assemblies on the front and back sides of a cabinet door.

According to another aspect of the present disclosure, a mirror on a back side of a cabinet door includes an area surrounded by an integrated (or built-in) light assembly, where a magnifying mirror is removably coupled to the area by magnetic attraction.

According to yet another aspect of the present disclosure, a magnifying mirror can be attached to an illuminated area on the back side of a cabinet door through magnetic attraction, where the position of the magnifying mirror can be adjusted anywhere in the illuminated area according to the actual needs of a user.

According to yet another aspect of the present disclosure, a backlight assembly is formed on a cabinet body of a cabinet. The backlight assembly provides ambient lighting and/or an additional light source for the cabinet. The backlight assembly can provide the same brightness and color temperature as one or more integrated (or built-in) light assemblies on the cabinet door, which can be adjusted synchronously or asynchronously through a controller.

FIG. 1A illustrates a perspective view of a cabinet 100, in accordance with an example implementation of the present disclosure. As illustrated in FIG. 1A, the cabinet 100 includes a cabinet body 102 and a cabinet door 120 coupled to the cabinet body 102.

In the present implementation, the cabinet 100 is a recessed cabinet where the cabinet body 102 is at least partially built or mounted into a wall (or a surface). The cabinet body 102 includes a flange 104 and a backlight assembly 106 around the peripheral edges of the cabinet body 102. When the cabinet body 102 is at least partially inserted into the wall, the flange 104 and the backlight assembly 106 protrude from the wall, such that the backlight assembly 106 can illuminate and scatter light off the wall, for example, to provide ambient lighting.

It should be noted that the cabinet 100 is not required to be inserted into a wall. In another implementation, the cabinet 100 is a surface-mounted cabinet where the cabinet body 102 is attached or mounted to a wall (or a surface), where the backlight assembly 106 can illuminate and scatter light off the wall, for example, to provide ambient lighting.

In some implementations, the cabinet 100 can be a medicine cabinet where the cabinet body 102 can include adjustable shelves to accommodate different sized items. In some implementations, the cabinet body 102 can include a double-layer aluminum frame, where two L-shaped exterior sidewalls extend into an exterior back wall of the cabinet body 102 to form a robust structure. In some implementations, the cabinet body 102 can be made with a variety of suitable materials including, but not limited to, wood, plastic, glass, metal, and any combination thereof.

In some implementations, the cabinet door 120 is coupled to the cabinet body 102 by one or more hinges. In some implementations, the cabinet door 120 can include an aluminum frame (e.g., a double-layer aluminum frame). In some implementations, the cabinet door 120 can be made with a variety of suitable materials including, but not limited to, wood, plastic, glass, metal, and any combination thereof.

As illustrated in FIG. 1A, the cabinet door 120 includes a front mirror with an integrated (or built-in) light assembly that provides at least one light source to illuminate objects facing the front mirror, for example, when the cabinet door 120 is in a closed position. The cabinet door 120 also includes a back mirror (not shown in FIG. 1A) with another integrated (or built-in) light assembly that provides at least another light source to illuminate objects facing the back mirror as well as contents in the cabinet body 102, for example, when the cabinet door 120 is in an open position. The cabinet 100 also includes a magnifying mirror (not shown in FIG. 1A) that is removably coupled to the back mirror in an area surrounded by the integrated (or built-in) light assembly, as described in detail below (e.g., with reference to FIGS. 1C-1F).

Figure 1B:
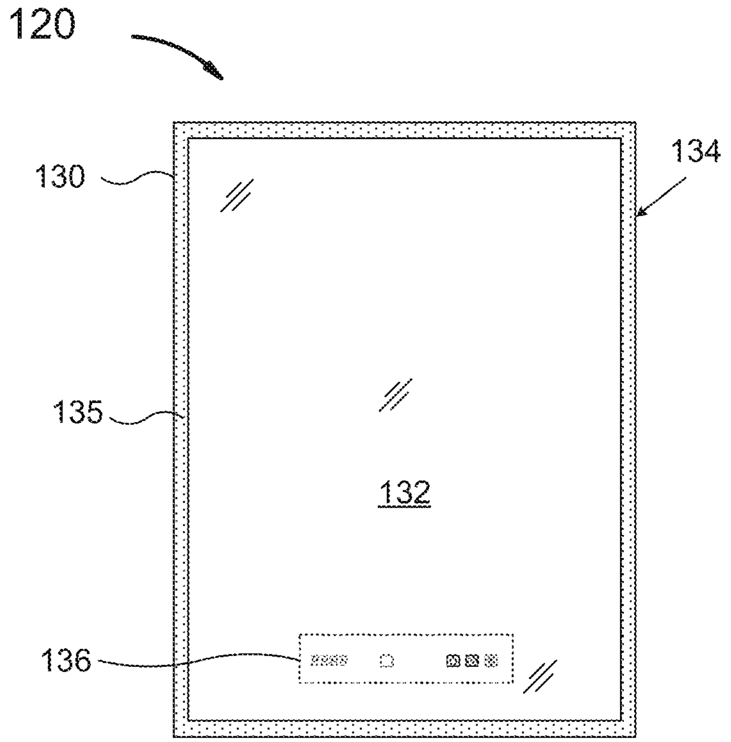
FIG. 1B illustrates a front view of a cabinet door of the cabinet shown in FIG. 1A, in accordance with an example implementation of the present disclosure.

FIG. 1B illustrates a front view of the cabinet door 120 of the cabinet 100 shown in FIG. 1A, in accordance with an example implementation of the present disclosure.

As illustrated in FIG. 1B, the cabinet door 120 includes a front (or first) layer 130 disposed on a front (or first) side of a door frame 122 (shown in FIG. 1D) of the cabinet door 120. The front layer 130 includes a front (or first) reflective surface (e.g., a front mirror) 132, a front layer integrated (or built-in) light assembly 134, and an integrated (or built-in) control and display panel 136.

In the present implementation, the front layer integrated (or built-in) light assembly 134 is formed along the peripheral edges (e.g., top, bottom, left, and right edges) of the front layer 130. As illustrated in FIG. 1B, the front layer 130 further includes frosted edges 135 which appear hazy or translucent, rather than clear and shiny like the front reflective surface 132, to allow light from one or more light sources coupled to (e.g., embedded in or placed behind) the front layer 130 to pass through. In one example, the frosted edges 135 may be achieved by sandblasting, grinding, or acid etching the edges of the front layer 130, which creates a microscopic texture that scatters light passing through the edges, resulting in the frosted appearance. In another example, the frosted edges 135 can be achieved by applying a thin film (e.g., made from vinyl or other plastics) with a frosted finish to the edges of the front layer 130.

The front layer integrated (or built-in) light assembly 134 includes one or more light sources (not shown in FIG. 1B) embedded in or positioned behind the front layer 130. Examples of the light sources may include, but are not limited to, light emitting diode (LED), fluorescent, incandescent, and halogen light sources. The light sources may take form in one or more light strips, arrays, tubes, and filaments. It should be understood that the front layer integrated (or built-in) light assembly 134 can also employ any other suitable light sources and in any other suitable shapes and forms.

As illustrated in FIG. 1B, the integrated (or built-in) control and display panel 136 is formed in the front layer 130 of the cabinet door 120. The integrated (or built-in) control and display panel 136 includes one or more touch pads (or touch buttons) on the front reflective surface 132 of the front layer 130 for receiving user input to turn on/off and adjust various settings of one or more electronic components in the cabinet 100. The integrated (or built-in) control and display panel 136 also includes a digital display, for example, to display a digital clock and/or a temperature reading on the front reflective surface 132.

In one example, one or more of the touch pads (or touch buttons) allow a user to turn on/off the front layer integrated (or built-in) light assembly 134, a back layer integrated (or built-in) light assembly 142 (shown in FIG. 1C), and the backlight assembly 106 (shown in FIG. 1A), either synchronously or asynchronously.

In another example, one or more of the touch pads (or touch buttons) allow the user to adjust the light settings, such as brightness and color temperature, of one or more of the front layer integrated (or built-in) light assembly 134, the back layer integrated (or built-in) light assembly 142 (shown in FIG. 1C), and the backlight assembly 106 (shown in FIG. 1A), either synchronously or asynchronously.

In yet another example, one or more of the touch pads (or touch buttons) allow the user to turn on/off a defogger to keep the front reflective surface 132 and/or a back reflective surface of the cabinet door 120 clear of fog or moisture. In yet another example, one or more of the touch pads (or touch buttons) allow the user to adjust and set a digital clock that is displayed on the front reflective surface 132.

The touch pads (or touch buttons) in the integrated (or built-in) control and display panel 136 may employ capacitive sensors and electronic circuitry to detect input (e.g., touch input from users) on the front reflective surface 132. The input received by the integrated (or built-in) control and display panel 136 is transmitted in the form of electric signals to a controller 172 in a compartment 170 (shown in FIG. 1C) of the cabinet body 102. The controller 172 is electrically coupled to a power management module 178 (shown in FIG. 1C) in the compartment 170, and controls (e.g., turning on/of and/or adjusting the settings of) the front layer integrated (or built-in) light assembly 134, the back layer integrated (or built-in) light assembly 142 (shown in FIG. 1C), the backlight assembly 106 (shown in FIG. 1A), and a de-fogger 138 (shown in FIG. 1D) based on the input received from the integrated (or built-in) control and display panel 136.

Figure 1C:
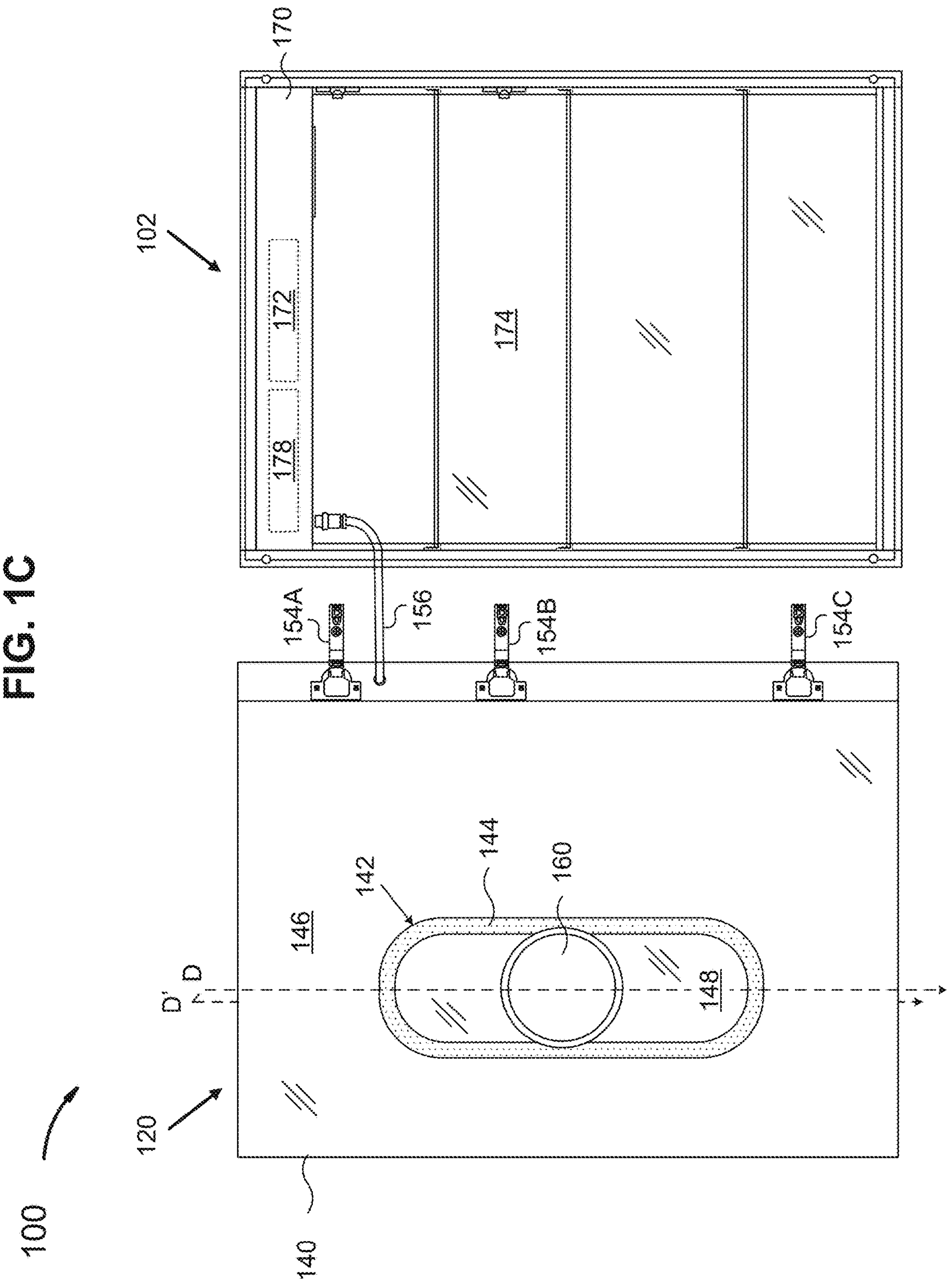
FIG. 1C illustrates a disassembled view of the cabinet in FIG. 1A showing an interior of a cabinet body and a back side of a cabinet door, in accordance with an example implementation of the present disclosure.

FIG. 1C illustrates a disassembled view of the cabinet 100 in FIG. 1A showing an interior of the cabinet body 102 and a back side of the cabinet door 120, in accordance with an example implementation of the present disclosure.

As illustrated in FIG. 1C, the cabinet door 120 includes a back (or second) layer 140 opposite the front layer 130 (shown in FIG. 1B). The back layer 140 is disposed on a back (or second) side of the door frame 122 (shown in FIG. 1D) of the cabinet door 120. The back layer 140 includes a back (or second) reflective surface (e.g., a back mirror) 146, the back layer integrated (or built-in) light assembly 142, and a magnifying mirror 160 removably coupled to the back reflective surface 146 in an area 148 surrounded by the back layer integrated (or built-in) light assembly 142.

In the present implementation, the back layer integrated (or built-in) light assembly 142 is formed in an interior region of the back layer 140 away from the peripheral edges. As illustrated in FIG. 1C, a ring 144 is formed on the back reflective surface 146. The ring 144 has a substantially oval shape, for example, having an elliptical track with straight sections. The ring 144 may be a frosted ring that appears hazy or translucent, rather than clear and shiny like the back reflective surface 146, to allow light from one or more light sources embedded in or placed behind the back layer 140 to pass through. In one example, the ring 144 may be achieved by sandblasting, grinding, or acid etching an oval ring on the back layer 140, which creates a microscopic texture that scatters light passing through the edges, resulting in the frosted appearance. In another example, the ring 144 can be achieved by applying a thin film (e.g., made from vinyl or other plastics) with a frosted finish to an oval ring on the back layer 140.

In the present implementation, the back layer integrated (or built-in) light assembly 142 includes one or more light sources (not explicitly shown in FIG. 1C) embedded in or positioned behind the back layer 140. Examples of the light sources may include, but are not limited to, LED, fluorescent, incandescent, and halogen light sources. The light sources may take form in light strips, arrays, tubes, and/or filaments. It should be understood that the back layer integrated (or built-in) light assembly 142 can also employ any other suitable light sources and in any other suitable shapes and forms.

The area 148 surrounded by the ring 144 of the back layer integrated (or built-in) light assembly 142 is configured to receive the magnifying mirror 160 through magnetic attraction.

In one implementation, a metallic plate having a shape that conforms to the shape of the area 148 (e.g., a substantially oval shape) is disposed behind the back layer 140. The magnifying mirror 160 includes a magnet on its back side. As such, the magnifying mirror 160 can be attached to the back reflective surface 146 in the area 148 by magnetic attraction. Also, because the metallic plate covers the entire area 148 behind the back layer 140, the magnifying mirror 160 can be attached to and detached from the back reflective surface 146 anywhere within the area 148. For example, the magnifying mirror 160 can be adjusted vertically up and down in the ring 144 to accommodate the height of different users. Also, because the back layer integrated (or built-in) light assembly 142 illuminates through the ring 144, the light around the magnifying mirror 160 provides better illumination of the magnified area, allowing for clearer vision and more precise grooming or makeup application for the user.

Specifically, the magnifying mirror 160 enlarges a specific area, which, in absence of enhanced lighting, can cause shadows and make it difficult to see details, especially in areas with lower light. The back layer integrated (or built-in) light assembly 142 around the magnifying mirror 160 acts as a direct light source, illuminating the magnified area and reducing shadows. This allows for better visibility of fine details, which is crucial for tasks such as applying makeup, tweezing, or putting in contact lenses. Because the magnifying mirror 160 is attached to a well-illuminated area (e.g., the area 148) surrounded by the back layer integrated (or built-in) light assembly 142, the magnifying mirror 160 does not require a built-in light ring or a separate power source.

In addition, certain tasks, such as makeup application, should ideally be done in natural light to ensure colors appear accurate. However, natural light isn't always available, and bathroom lighting can often be harsh or overhead, casting unflattering shadows. As the settings (e.g., brightness and color temperature) of the back layer integrated (or built-in) light assembly 142 can be adjusted to mimic natural light, the magnifying mirror 160 in combination with the back layer integrated (or built-in) light assembly 142 can provide a more neutral and balanced light source that helps with applying makeup more accurately.

Because the position of the magnifying mirror 160 can be adjusted anywhere in the area 148 surrounded by the ring 144, the back layer integrated (or built-in) light assembly 142 can provide better illumination no matter where the magnifying mirror 160 is positioned in the area 148, for example, to accommodate users with different heights.

As illustrated in FIG. 1C, the cabinet door 120 is coupled to the cabinet body 102 by one or more hinges (e.g., hinges 154A, 154B, and 154C). One or more power and control signal wires (or cables) 156 connect the electronic components in the cabinet door 120 and the controller 172 in the compartment 170 in the cabinet body 102.

In one implementation, the cabinet body 102 may be medicine cabinet and have adjustable shelves to accommodate various items. The cabinet body 102 includes an interior back wall 174. In one implementation, the interior back wall 174 has a reflective surface such that when the cabinet door

120 is open, the interior back wall 174 of the cabinet body 102 can function as a mirror for the user.

Figure 1D:
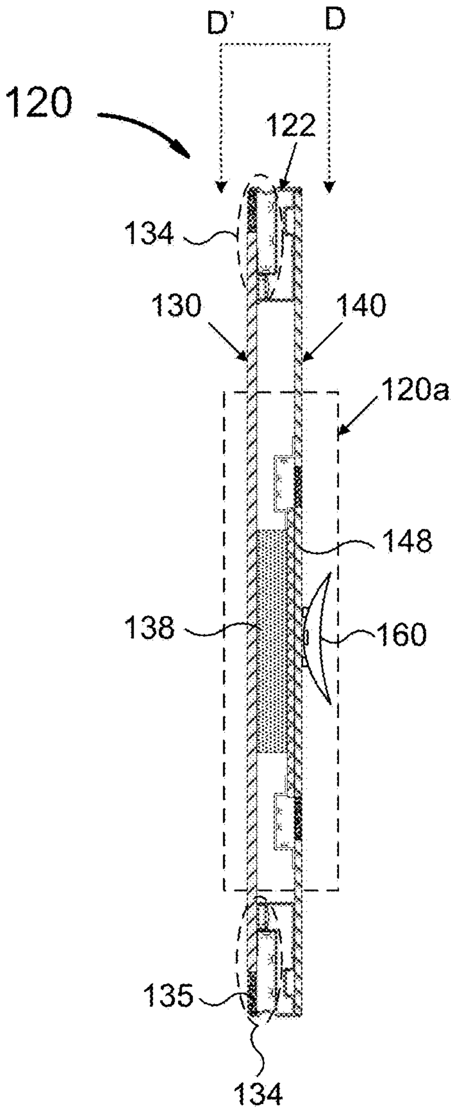
FIG. 1D illustrates a cross-sectional view of the cabinet door shown in FIG. 1C along the line D-D', in accordance with an example implementation of the present disclosure.
Figure 1E:
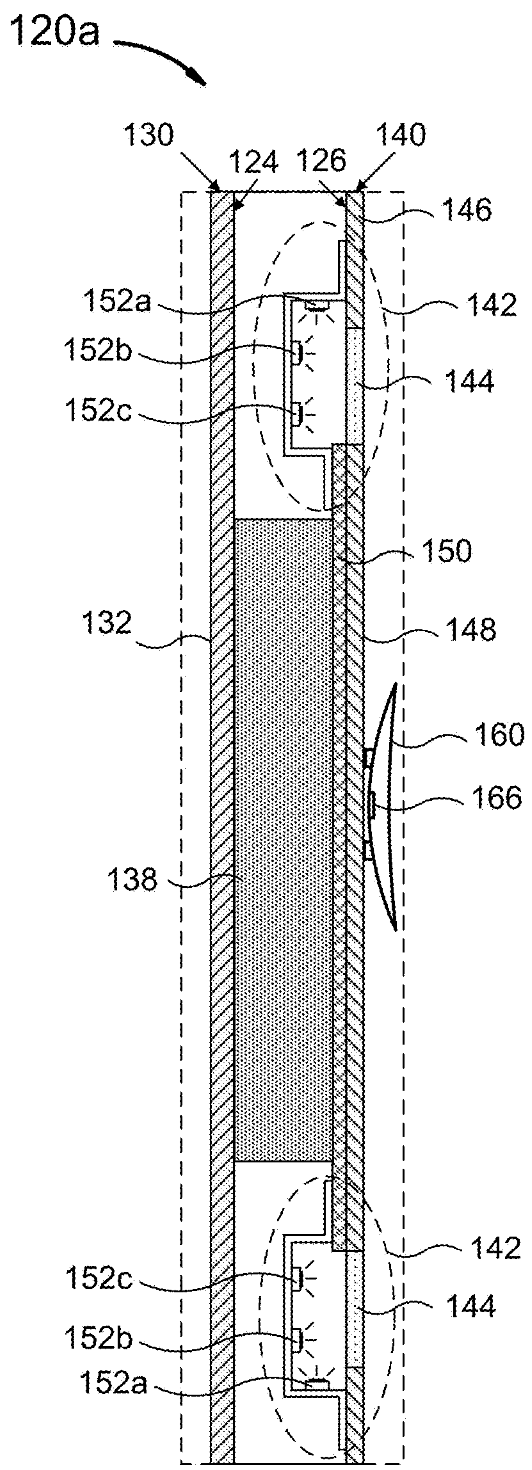
FIG. 1E illustrates an enlarged cross-sectional view of a portion of the cabinet door shown in FIG. 1D, in accordance with an example implementation of the present disclosure.

FIG. 1D illustrates a cross-sectional view of the cabinet door 120 shown in FIG. 1C along the line D-D', in accordance with an example implementation of the present disclosure. FIG. 1E illustrates an enlarged cross-sectional view of a portion 120*a* of the cabinet door 120 shown in FIG. 1D, in accordance with an example implementation of the present disclosure.

As illustrated in FIGS. 1D and 1E, the cabinet door 120 includes the door frame 122, the front layer 130 disposed on a front (or first) side 124 of the door frame 122, and the back layer 140 disposed on a back (or second) side 126 of the door frame 122. In one implementation, the door frame 122 is made of a light-weight material, such as aluminum.

The front layer integrated (or built-in) light assembly 134 is formed along the peripheral edges of the front layer 130, where one or more light sources are embedded in or placed behind (e.g., in a light chamber) the front layer 130. The light sources are configured to illuminate through the frosted edges 135 of the front layer 130.

The de-fogger 138 is formed between and in contact with the front layer 130 and the back layer 140 to prevent both the front reflective surface 132 of the front layer 130 and the back reflective surface 146 of the back layer 140 from fogging up. In one implementation, the de-fogger 138 includes one or more heating elements (e.g., one or more thin mats or pads) that can generate heat when turned on. The warmth from the heating elements can raise the front layer 130's (as well as the back layer 140's) surface temperature slightly above the bathroom's dew point, the temperature at which condensation occurs. By keeping the front layer 130 and the back layer 140 warmer, the de-fogger 138 can prevent moisture from condensing on the front reflective surface 132 and the back reflective surface 146 (e.g., in the area 148), thus preventing fog. The de-fogger 138 can improve visibility after showering without waiting for the fog or moisture to dissipate naturally.

The magnifying mirror 160 is removably attached to the area 148 of the back reflective surface 146 surrounded (or enclosed) by the ring 144 of the back layer integrated (or built-in) light assembly 142.

In the present implementation, a metallic plate 150 is disposed behind the area 148 of the back reflective surface 146. The metallic plate 150 has a shape that substantially conforms to the shape of the area 148. As such, the magnifying mirror 160 having a magnet 166 on its back side can be removably attached to the area 148 of the back reflective surface 146 by the magnetic attraction between the metallic plate 150 and the magnet 166.

In another implementation, a magnetic plate can be disposed behind the area 148 of the back reflective surface 146. The magnetic plate can have a shape that substantially conforms to the shape of the area 148. The magnifying mirror can have a metallic plate (or any suitable metallic component) on its back side. As such, the magnifying mirror 160 can be removably attached to the area 148 of the back reflective surface 146 by the magnetic attraction between the magnetic plate and the metallic component of the magnifying mirror 160. It should be noted that the manner by which the magnifying mirror 160 can be removably attached to the area 148 of the back reflective surface 146 is not limited to magnetic attraction, and can include any other suitable methods.

The back layer integrated (or built-in) light assembly 142 is coupled to the back layer 140. As illustrated in FIG. 1E, one or more light sources (e.g., light sources 152*a*, 152*b*, and 152*c*) are placed behind (or embedded in) the back layer 140, for example, in a light chamber behind the ring 144. The light sources 152*a*-152*c* are controlled by the controller 172 based on user input through the touch pads on the integrated (or built-in) control and display panel 136 (shown in FIG. 1B). The light sources 152*a*, 152*b*, and 152*c* can each have adjustable color temperatures and brightness.

Figure 1F:
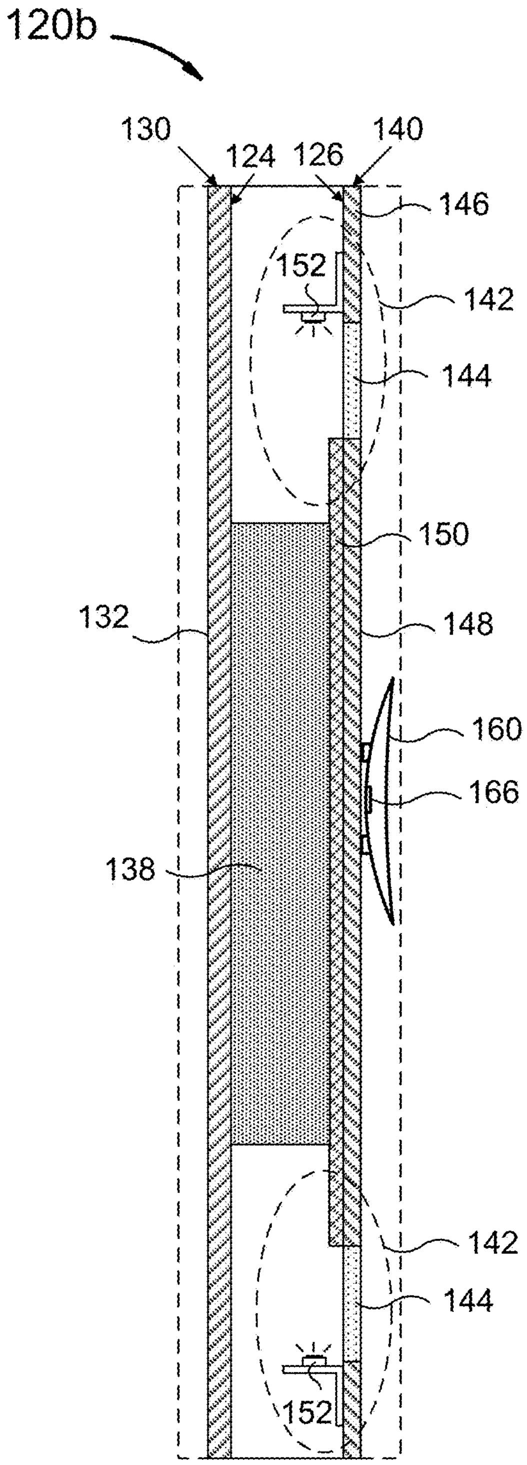
FIG. 1F illustrates an enlarged cross-sectional view of a portion of the cabinet door shown in FIG. 1C along the line D-D', in accordance with another example implementation of the present disclosure.

FIG. 1F illustrates an enlarged cross-sectional view of a portion 120*b* of the cabinet door 120 shown in FIG. 1C along the line D-D', in accordance with another example implementation of the present disclosure.

In this implementation, the portion 120*b* is substantially similar to the portion 120*a* shown in FIG. 1E. Different from the portion 120*a*, the back layer integrated (or built-in) light assembly 142 of the portion 120*b* has a light shelf (or a light rack) instead of a light chamber to secure one or more light sources 152 to the back layer 140.

Figure 1G:
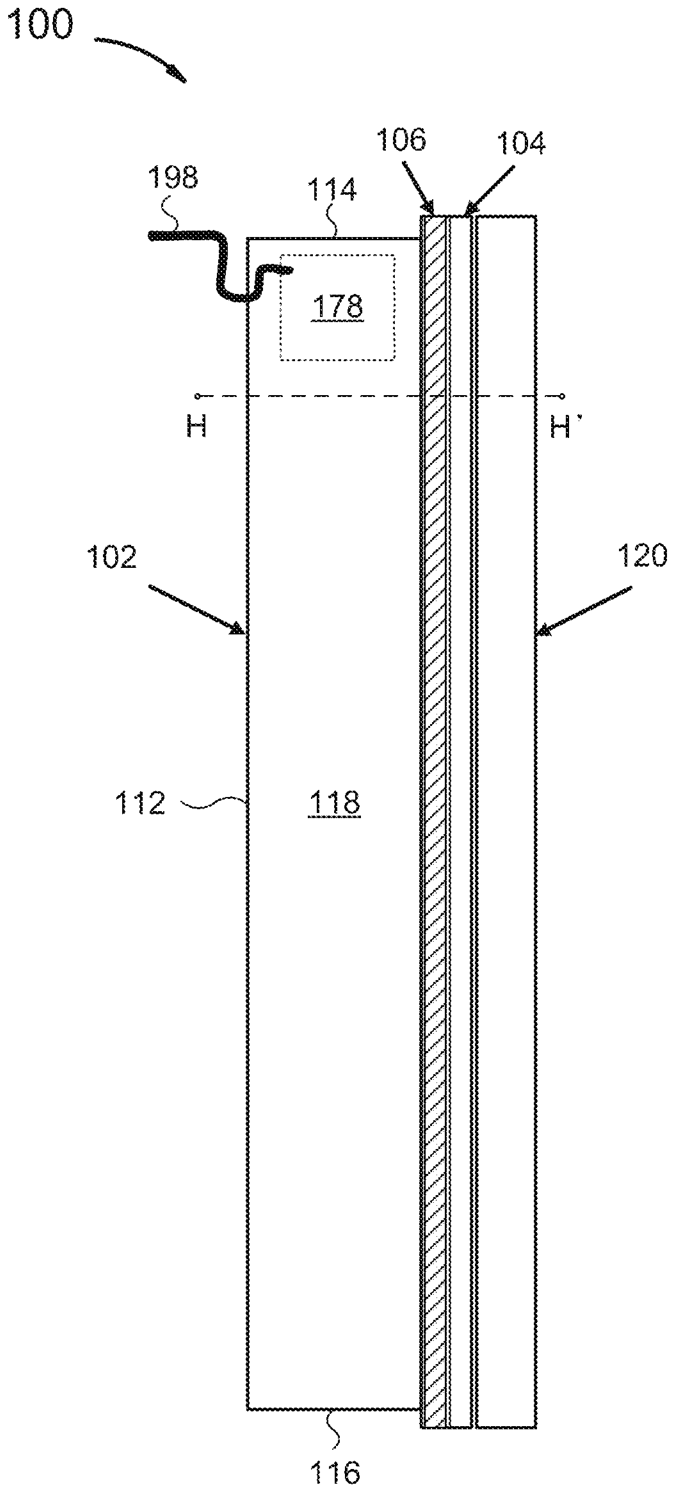
FIG. 1G illustrates a side view of the cabinet shown in FIG. 1A, in accordance with an example implementation of the present disclosure.

FIG. 1G illustrates a side view of the cabinet 100 shown in FIG. 1A, in accordance with an example implementation of the present disclosure. As shown in FIG. 1G, the cabinet body 102 includes an exterior back wall 112, an exterior top wall 114, an exterior bottom wall 116, and exterior sidewalls 118. The cabinet body 102 also includes the flange 104 at a front end bordering the cabinet door 120. The backlight assembly 106 is formed adjacent to (e.g., behind) the flange 104 of the cabinet body 102, where the backlight assembly 106 is configured to function as an additional light source (e.g., to provide ambient light) from the cabinet body 102 in addition to the light sources in the front layer integrated (or built-in) light assembly 134 and the back layer integrated (or built-in) light assembly 142 on the cabinet door 120.

The backlight assembly 106 includes one or more light sources in a light chamber (shown in FIG. 1H) and is placed adjacent to the flange 104 along the peripheral edges of the cabinet body 102. The one or more light sources are controlled by the controller 172 based on user input through the touch pads on the integrated (or built-in) control and display panel 136. The light sources can each have adjustable color temperatures and brightness.

Figure 1H:
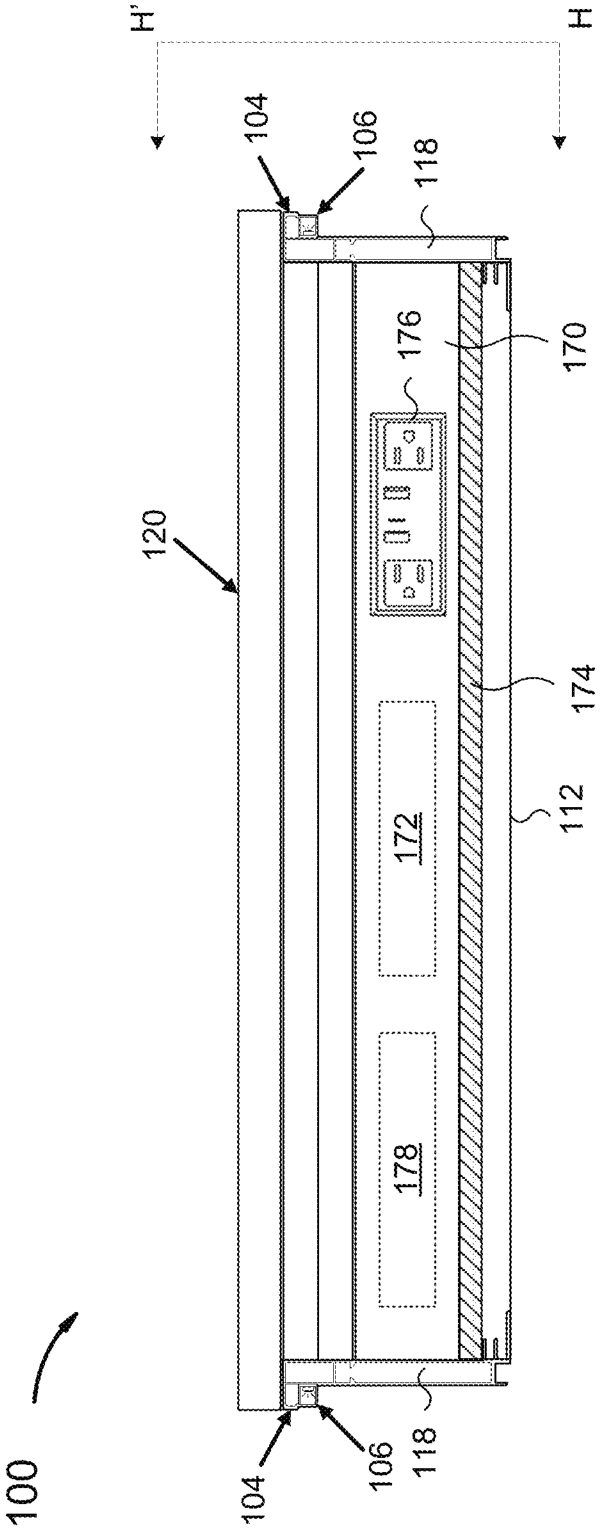
FIG. 1H illustrates a cross-sectional view of the cabinet shown in FIG. 1G along the line H-H', in accordance with an example implementation of the present disclosure.

FIG. 1H illustrates a cross-sectional view of the cabinet 100 shown in FIG. 1G along the line H-H', in accordance with an example implementation of the present disclosure.

As illustrated in FIG. 1H, the cabinet body 102 includes the exterior back wall 112 and the exterior sidewalls 118, where the exterior sidewalls 118 each have an L-shape with forks extending into the exterior back wall 112.

As illustrated in FIG. 1H, the flange 104 and the backlight assembly 106 are disposed on the exterior sidewalls 118 of the cabinet body 102. It should be understood that, although not shown in FIG. 1H, the flange 104 and the backlight assembly 106 are also disposed on the exterior top wall 114 and the exterior bottom wall 116. The interior back wall 174 of the cabinet body 102 is positioned in the cabinet body 102 and abutting the exterior back wall 112. The interior back wall 174 has a reflective surface such that when the cabinet door 120 is open, the interior back wall 174 of the cabinet body 102 can function as a mirror for the user.

It is noted that when the cabinet body 102 is built (or inserted) into the wall, the flange 104 and the backlight assembly 106 protrude from the wall (instead of being built or inserted into the wall), such that the backlight assembly 106 can illuminate and scatter light off the wall. In an example, when the cabinet door 120 is closed, the backlight assembly 106 can project light from behind the flange 104, for example, to provide ambient lighting. In another example, when the cabinet door 120 is open, as the user is looking at the back side (e.g., the back layer 140) of the cabinet door 120, the backlight assembly 106 can provide another source of light to complement the light provided by the back layer integrated (or built-in) light assembly 142 from a different angle. In yet another example, when the cabinet door 120 is open, as the user is looking at the interior back wall 174 of the cabinet body 102, the backlight assembly 106 provides ambient light around the cabinet body 102 to illuminate the objects in and around the cabinet body 102.

As shown in FIGS. 1G and 1H, the compartment 170 is positioned near the top of the cabinet body 102. The controller 172 is situated inside the compartment 170. The compartment 170 can also include the power management module 178 (e.g., having one or more power adapters, converters, and/or transformers) to receive an input power (e.g., alternating current (AC) or direct current (DC) power) through one or more power cables 198 and provide output power to the electronic components of the cabinet 100. The compartment 170 can also include one or more power and USB outlets 176 at a bottom surface thereof.

Figure 2A:
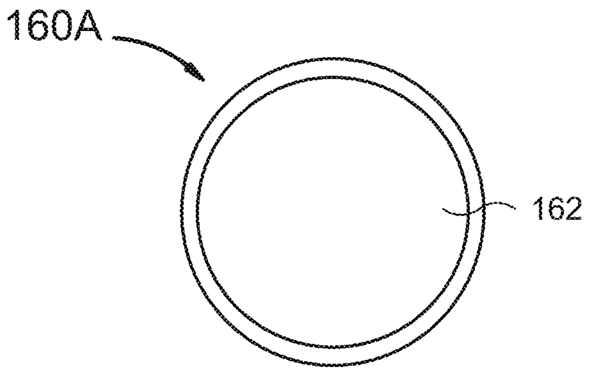
FIG. 2A illustrates a front side of a magnifying mirror shown in FIG. 1C, in accordance with an example implementation of the present disclosure.
Figure 2B:
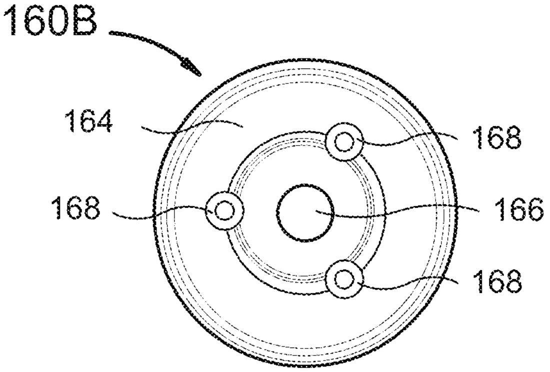
FIG. 2B illustrates a back side of the magnifying mirror shown in FIG. 2A, in accordance with an example implementation of the present disclosure.
Figure 2C:
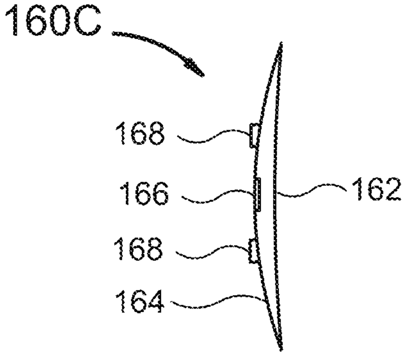
FIG. 2C illustrates a side view of the magnifying mirror shown in FIG. 2A, in accordance with an example implementation of the present disclosure.
Figure 3B:
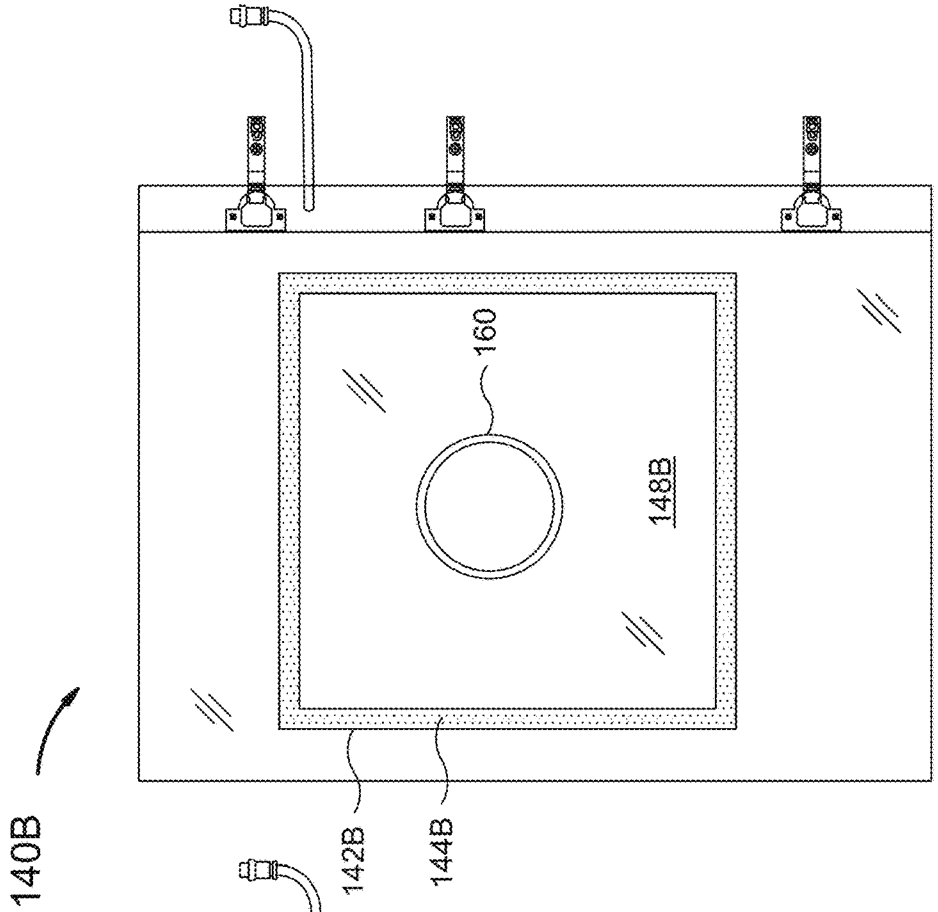
FIGS. 3A, 3B, 3C, and 3D each illustrate a back layer of a cabinet door having a back layer integrated (or built-in) light assembly in a different shape, in accordance with various example implementations of the present disclosure.
Figure 3A:
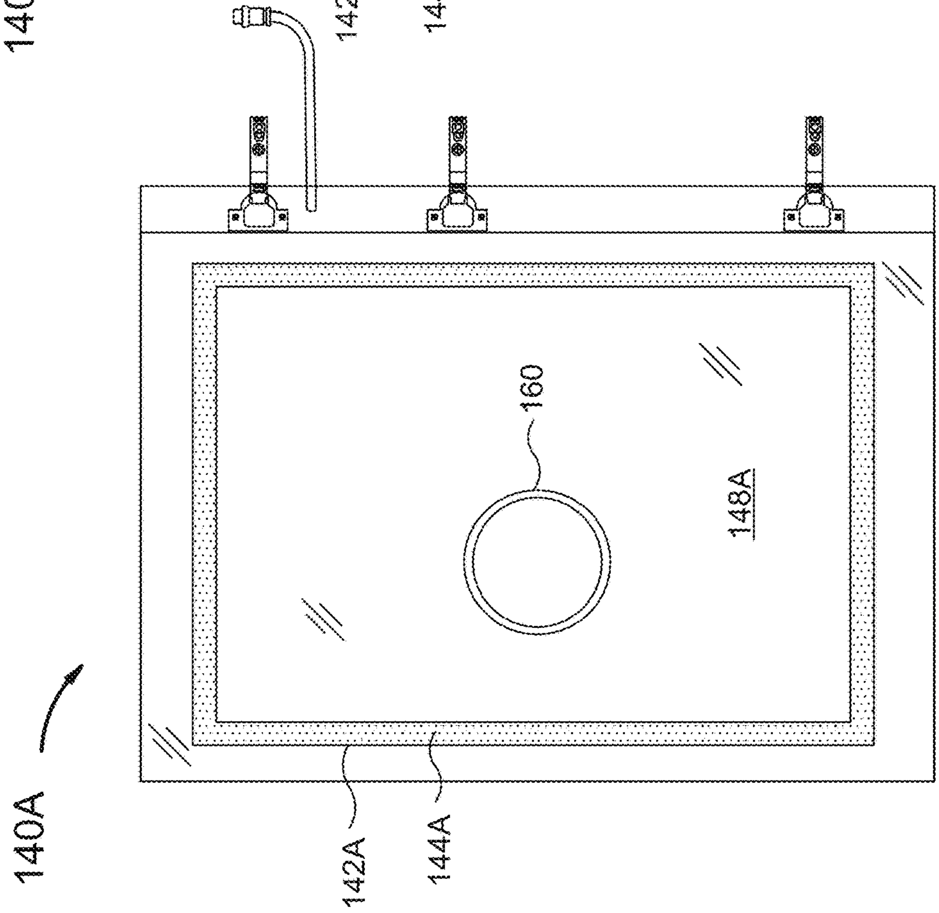
Figure 3D:
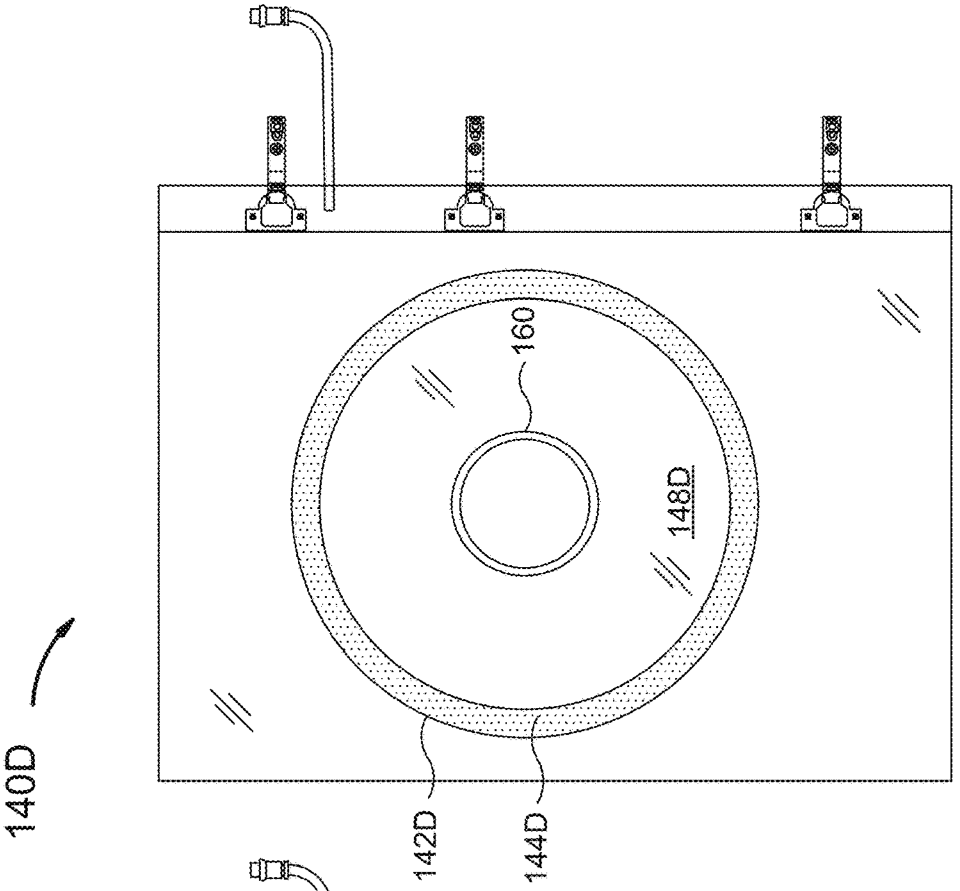
Figure 3C:
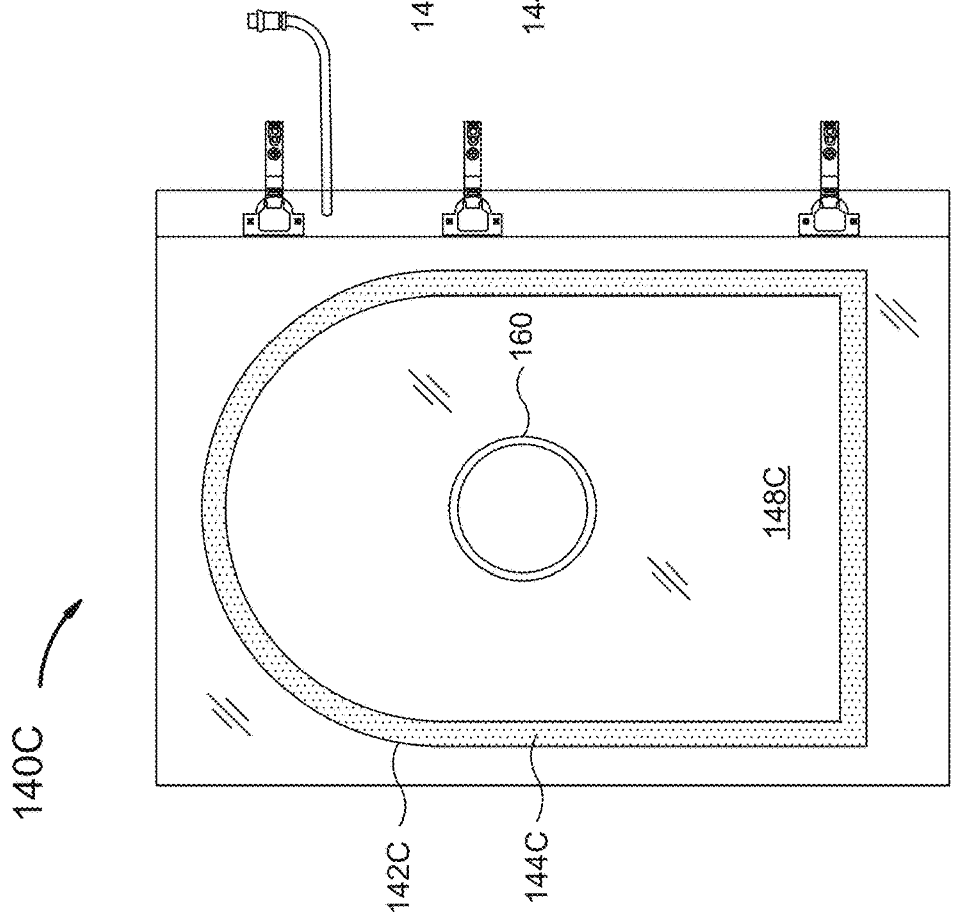

FIG. 2A illustrates a front side view 160A of the magnifying mirror 160 shown in FIG. 1C, in accordance with an example implementation of the present disclosure. FIG. 2B illustrates a back side view 160B of the magnifying mirror 160 shown in FIG. 2A, in accordance with an example implementation of the present disclosure. FIG. 2C illustrates a side view 160C of the magnifying mirror 160 shown in FIG. 2A, in accordance with an example implementation of the present disclosure.

As shown in FIGS. 2A-2C, the magnifying mirror 160 has a front magnification surface 162 and a back side 164. The front magnification surface 162 has a concave surface to provide magnification. In some implementations, the magnifying mirror 160 may have a magnification power of 2 times (2×) to 10 times (10×). In some implementations, the magnifying mirror 160 may have a magnification power of more than 10 times (10×). The back side 164 may include the magnet 166 positioned in the center of the back side 164. The back side 164 also includes one or more cushion bases 168 for providing cushion between the back side 164 of the magnifying mirror 160 and the back reflective surface 146 when the magnifying mirror 160 is removably attached to the back reflective surface 146 in the area 148 by the magnetic attraction force between the magnet 166 and the metallic plate 150.

FIGS. 3A, 3B, 3C, and 3D each illustrate a back layer 140A/140B/140C/140D of a cabinet door having a back layer integrated (or built-in) light assembly in a different shape, in accordance with various example implementations of the present disclosure. For example, in FIG. 3A, a ring 144A of a back layer integrated (or built-in) light assembly 142A has a rectangular shape. In another example, in FIG. 3B, a ring 144B of a back layer integrated (or built-in) light assembly 142B has a square shape. In yet another example, in FIG. 3C, a ring 144C of a back layer integrated (or built-in) light assembly 142C has an arched shape. In yet another example, in FIG. 3D, a ring 144D of a back layer integrated (or built-in) light assembly 142D has a circular shape.

It should be understood that a metallic plate enclosed by the ring 144A/144B/144C/144D can be made to have a shape that substantially conforms to the shape of an area 148A/148B/148C/148D enclosed by the frosted ring 144A/144B/144C/144D. As such, the magnifying mirror 160 can be removably coupled to any location within the corresponding area 148A/148B/148C/148D.

Figure 4C:
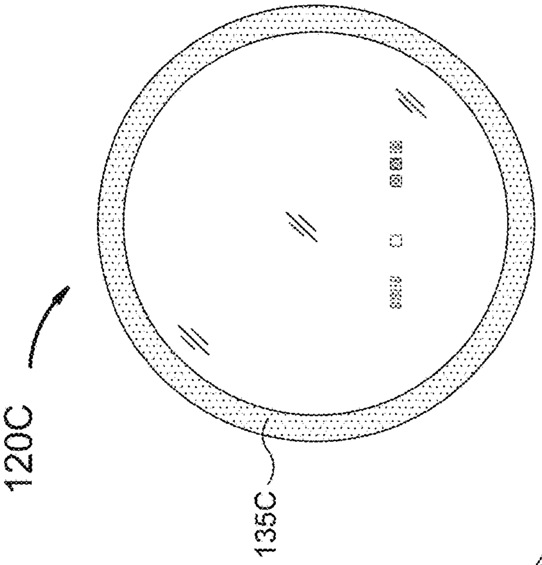
FIGS. 4A, 4B, and 4C each illustrate a cabinet door having a different shape, in accordance with various example implementations of the present disclosure.
Figure 4B:
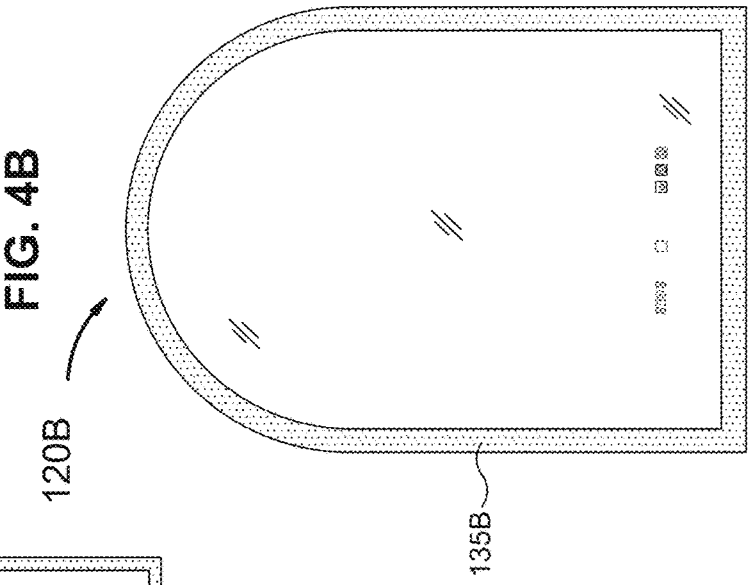
Figure 4A:
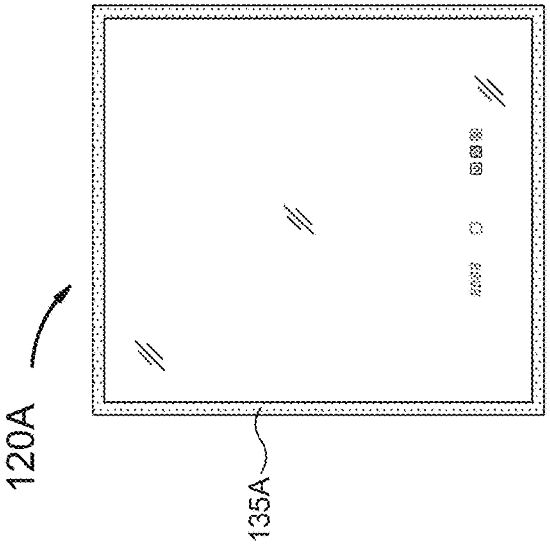

FIGS. 4A, 4B, and 4C each illustrate a cabinet door 120A/120B/120C having a different shape, in accordance with various example implementations of the present disclosure. For example, in FIG. 4A, the cabinet door 120A (as well as frosted edges 135A) has a square shape. In another example, in FIG. 4B, the cabinet door 120B (as well as frosted edges 135B) has an arch shape. In yet another example, in FIG. 4C, the cabinet door 120C (as well as frosted edges 135C) has a circular shape.

It should be understood that the cabinet body can be made to have a shape that substantially conforms to the shape of the cabinet door 120A/120B/120C in accordance with the various different implementations of the present disclosure. It should be understood that the size and shape of the cabinet 100 are not limited to the implementations shown in the present disclosure. That is, the cabinet 100 can be in any other suitable shapes and forms.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A cabinet, comprising:
- a cabinet body; and
- a cabinet door coupled to the cabinet body, wherein the cabinet door comprises:
  - a door frame;
  - a first layer disposed on a first side of the door frame;
  - a second layer disposed on a second side of the door frame opposite of the first side, the second layer having a reflective surface;
  - a light assembly coupled to the second layer and configured to illuminate through the second layer; and
  - a mirror removably coupled to an area of the second layer surrounded by the light assembly.

2. The cabinet of claim 1, wherein the cabinet body comprises:
- an exterior back wall;
- an exterior top wall;
- an exterior bottom wall;
- exterior sidewalls; and
- a backlight assembly disposed on at least one of the exterior back wall, the exterior top wall, the exterior bottom wall, and the exterior sidewalls.

3. The cabinet of claim 1, wherein the mirror comprises a magnifying mirror removably coupled to the area of the second layer through magnetic attraction.

4. The cabinet of claim 1, further comprising:
- a metallic plate between the door frame and the area of the second layer, wherein the mirror is removably coupled to the area of the second layer through magnetic attraction to the metallic plate.

5. The cabinet of claim 1, wherein:
- a back side of the mirror comprises at least one magnet; and the at least one magnet is removably coupled to a metallic plate positioned behind the area of the second layer.

6. The cabinet of claim 1, wherein a back side of the mirror comprises at least one cushion base.

7. The cabinet of claim 1, wherein the light assembly comprises at least one light source.

8. The cabinet of claim 7, wherein the at least one light source comprises one or more light-emitting diode (LED) light strips.

9. The cabinet of claim 1, further comprising another light assembly coupled to the first layer and configured to illuminate through the first layer.

10. The cabinet of claim 1, further comprising:

a controller coupled to a control panel in the first layer;

wherein the controller is configured to receive input from the control panel to perform at least one of:

turning on and off the light assembly;

adjusting a brightness of the light assembly; and adjusting a color temperature of the light assembly.

11. A cabinet door, comprising:

a door frame;

a first layer disposed on a first side of the door frame;

a second layer disposed on a second side of the door frame opposite of the first side, the second layer having a reflective surface;

a light assembly coupled to the second layer and configured to illuminate through the second layer; and a mirror removably coupled to an area of the second layer surrounded by the light assembly.

12. The cabinet door of claim 11, wherein the mirror comprises a magnifying mirror removably coupled to the area of the second layer through magnetic attraction.

13. The cabinet door of claim 11, further comprising:

a metallic plate between the door frame and the area of the second layer, wherein the mirror is removably coupled to the area of the second layer through magnetic attraction to the metallic plate.

14. The cabinet door of claim 11, wherein:

a back side of the mirror comprises at least one magnet; and the at least one magnet is removably coupled to a metallic plate positioned behind the area of the second layer.

15. The cabinet door of claim 11, wherein a back side of the mirror comprises at least one cushion base.

16. The cabinet door of claim 11, wherein the light assembly comprises at least one light source.

17. The cabinet door of claim 16, wherein the at least one light source comprises one or more light-emitting diode (LED) light strips.

18. The cabinet door of claim 11, further comprising another light assembly coupled to the first layer and configured to illuminate through the first layer.

19. The cabinet door of claim 11, further comprising:

a control panel in the first layer; and a controller coupled to the control panel to control the light assembly.

20. The cabinet door of claim 19, wherein the controller is configured to receive input from the control panel to perform at least one of:

turning on and off the light assembly;

adjusting a brightness of the light assembly; and adjusting a color temperature of the light assembly.

* * * * *